US012783965B2

(12) United States Patent
Vall-llosera et al.

(10) Patent No.: US 12,783,965 B2
(45) Date of Patent: Nov. 3, 2026

(54) QUANTUM COMPUTING DEVICE IN A SUPPORT VECTOR MACHINE ALGORITHM

(71) Applicant: Telefonaktiebolaget LM Ericsson (publ), Stockholm (SE)

(72) Inventors: Gemma Vall-llosera, Järfälla (SE); Ahsan Javed Awan, Vallentuna (SE); Jiaying Yang, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1131 days.

(21) Appl. No.: 17/621,499

(22) PCT Filed: Jun. 28, 2019

(86) PCT No.: PCT/SE2019/050640

§ 371 (c)(1),
(2) Date: Dec. 21, 2021

(87) PCT Pub. No.: WO2020/263144

PCT Pub. Date: Dec. 30, 2020

(65) Prior Publication Data

US 2022/0366314 A1 Nov. 17, 2022

(51) Int. Cl.
*G06N 10/80* (2022.01)
*G06N 10/60* (2022.01)
*G06N 20/10* (2019.01)

(52) U.S. Cl.
CPC ............ *G06N 20/10* (2019.01); *G06N 10/60* (2022.01); *G06N 10/80* (2022.01)

(58) Field of Classification Search
CPC ......... G06N 20/10; G06N 10/60; G06N 10/80
See application file for complete search history.

(56) References Cited

U.S. PATENT DOCUMENTS

2019/0378025 A1* 12/2019 Corcoles-Gonzalez .................... G06N 10/60
2020/0320437 A1* 10/2020 Gambetta .............. G06N 10/20

OTHER PUBLICATIONS

Havlicek et al., Supervised Learning with Quantum Enhanced Feature Spaces, Jun. 2018. (Year: 2018).*
Coles et al., Quantum Algorithm Implementations for Beginners, Apr. 2018. (Year: 2018).*
Wright, John. Lecture 2: Quantum Math Basics, Sep. 2015. (Year: 2015).*
Schuld et al., An Introduction to Quantum Machine Learning, Sep. 2014. (Year: 2014).*
Rebentrost et al., Quantum Support Vector Machine for Big Data Classification, Jul. 2014. (Year: 2014).*

(Continued)

*Primary Examiner* — Marshall L Werner
(74) *Attorney, Agent, or Firm* — COATS & BENNETT, PLLC

(57) ABSTRACT

A method of determining a kernel matrix for a support vector machine algorithm using a quantum computing device without quantum tomography is disclosed. The method comprises manipulating quantum states of qubits of a quantum computing device based on a plurality of training vectors, each training vector representing a respective classification, determining a measurement of a status of at least one of the qubits, and computing the kernel matrix based on the measurement using a classical computing device.

12 Claims, 6 Drawing Sheets

(56) References Cited

OTHER PUBLICATIONS

Li et al., Exponential Realization of Quantum Artificial Intelligence, Oct. 2014. (Year: 2014).*

Li et al., Experimental Realization of a Quantum Support Vector Machine, Physical Review Letters 114, 140504, Apr. 2015. (Year: 2015).*

Havlicek, V. et al., "Supervised learning with quantum enhanced feature spaces", Nature, Jun. 5, 2018, pp. 1-22, vol. 567.

Li, Z. et al., "Experimental Realization of Quantum artificial intelligence", Physical Review Letters, Oct. 4, 2014 pp. 1-7, vol. 114.

Schuld, M. et al., "An introduction to quantum machine learning", Contemporary Physics, Oct. 15, 2014 pp. 1-15, vol. 56, No. 2.

Nielsen, M. et al., "Quantum Computation and Quantum Information", 10th Anniversary Edition, Mar. 2010, pp. 1-710, Cambridge University Press.

Li, Z. et al., "Experimental Realization of a Quantum Support Vector Machine", Physical Review Letters, Apr. 10, 2015, pp. 1-5, vol. 114.

Harrow, A. et al., "Quantum algorithm for linear systems of equations", Physical Review Letters, Sep. 30, 2009, pp. 1-15, vol. 15., No. 103.

Thew et al., "Quidit quantum-state tomography", Phyiscal Review A 66, 012303, The American Physical Society, 2002, pp. 012303-012303-6.

* cited by examiner

100

200

500

600

700

800

900

QUANTUM COMPUTING DEVICE IN A SUPPORT VECTOR MACHINE ALGORITHM

TECHNICAL FIELD

Examples of the present disclosure relate to a quantum computing device in a support vector machine algorithm, and using such as device in a support vector machine algorithm. Examples of the present disclosure also relate to determining a kernel matrix for a support vector machine algorithm using a quantum computing device, and classifying a test vector in a support vector machine algorithm using a quantum computing device.

BACKGROUND

Machine learning (ML) can be used to build a computational model based on training data to help make decisions or predictions. In some cases, there may be a large amount of training data, and thus the training process of machine learning algorithms can be time-consuming. To solve this, other computing hardware may be used to provide more computational power and accelerate the existing algorithms. Quantum computing devices can take this role, and thus the original machine learning algorithms need to be redesigned as quantum circuits.

A Support Vector Machine (SVM) is a supervised machine learning technique for solving classification problems. The computational complexity of SVM is 0[poly (NM)], and is proportional to the polynomial in NM, where N is the number of dimensions of the data, and M is the number of training data. The quantum support vector machine (QSVM) is the quantum analogue of SVM algorithm, presented in reference [1], and it can achieve a complexity of 0[log(NM)] on both the training and testing process. This can be exponentially less complex than the classical support vector machine (CSVM) algorithm. Reference [2] propose a QSVM system to classify two-dimensional data points into two sub-groups. The structure of an example QSVM system 100 is shown in FIG. 1, which includes two independent quantum circuits, a quantum circuit 102 to compute a kernel matrix for a SVM algorithm, and a quantum circuit 104 for QSVM classification (i.e. to classify a test vector). Each of the quantum circuits 102, 104 is followed by a respective quantum tomography technique 106, 108 for the result readout. A quantum tomography technique is suggested as an example in reference [3].

An example of a quantum circuit 200 to compute the kernel matrix is shown in FIG. 2. The quantum circuit 200 may be an example of the quantum circuit shown in FIG. 1. The quantum circuit 200 comprises two qubits of initial state $|0\rangle$. A first qubit includes a Hadamard gate 202, which is followed by a training data oracle 204. The training data oracle includes a first controlled rotation gate 206 on a second qubit controlled by the first qubit and having an angle based on a first training vector $\theta_1$. This is followed by a second controlled rotation gate 208 on the second qubit controlled by the first qubit and having an angle based on a second training vector $\theta_2$. The quantum tomography 106 shown in FIG. 1 then determines the kernel matrix K from the quantum circuit 200.

An example of a quantum circuit 300 for QSVM classification is shown in FIG. 3. The quantum circuit 300 may be an example of the quantum circuit 104 shown in FIG. 1. The quantum circuit includes four qubits. Qubits $q_1$, $q_2$ and $q_4$ have the initial state $|0\rangle$, whereas qubit $q_3$ has the initial state $|y\rangle$. The quantum circuit 300 includes matrix inversion part 302, followed by a training data oracle 304 which includes two rotation gates based on the angles of the two training vectors. This is in turn followed by a test data oracle 306 which includes one rotation gate based on the angle $\theta_0$ based on a test or test vector (i.e. the vector to be classified). The operation of the quantum circuit 300 for QSVM classification is described for instance in references [2] and [6]. The quantum tomography 108 shown in FIG. 1 then determines the classification of the test vector from the quantum circuit 300.

SUMMARY

One aspect of this disclosure provides a method of determining a kernel matrix for a support vector machine algorithm using a quantum computing device without quantum tomography. The method comprises manipulating quantum states of qubits of a quantum computing device based on a plurality of training vectors, each training vector representing a respective classification. The method also comprises determining a measurement of a status of at least one of the qubits, and computing the kernel matrix based on the measurement using a classical computing device.

Another aspect of this disclosure provides a method of determining a kernel matrix for a support vector machine algorithm based on M training vectors, M≥2. The method comprises determining a partial trace of ρ, where $\rho=|\phi\rangle\langle\phi|$, and $$|\phi\rangle = \frac{1}{\sqrt{M}}\begin{bmatrix} \overline{(x_1)_1} \\ \overline{(x_1)_2} \\ \overline{(x_2)_1} \\ \overline{(x_2)_2} \\ \vdots \\ \overline{(x_M)_1} \\ \overline{(x_M)_2} \end{bmatrix},$$

where $\overline{(x_n)_1}$ and $\overline{(x_n)_2}$ are first and second dimensions respectively of training vector n, n=1, . . . , M.

An additional aspect of this disclosure provides a method of determining a kernel matrix for a support vector machine algorithm using a quantum computing device based on M training vectors, M≥2. The method comprises performing a respective rotation on the $n^{th}$ qubit of the quantum computing device by an $n^{th}$ angle based on an $n^{th}$ training vector of the training vectors, n=1, . . . , M, and measuring a respective state of each qubit to obtain M two-dimensional results $$\begin{bmatrix} \overline{(x_n)_1} \\ \overline{(x_n)_2} \end{bmatrix},$$

n=1, . . . , M. The method also comprises calculating the tensor product of all of the two-dimensional results $$\begin{bmatrix} \overline{(x_n)_1} \\ \overline{(x_n)_2} \end{bmatrix}$$

to obtain a vector:

$$|\psi\rangle = \begin{bmatrix} \overline{(x_1)_1} \\ \overline{(x_1)_2} \\ \overline{(x_2)_1} \\ \overline{(x_2)_2} \\ \vdots \\ \overline{(x_M)_1} \\ \overline{(x_M)_2} \end{bmatrix},$$

and determining the kernel matrix from a partial trace of matrix $$\frac{1}{M}|\psi\rangle\langle\psi|.$$

A further aspect of this disclosure provides a method of classifying a test vector using a support vector machine algorithm. The method comprises determining a kernel matrix of the support vector machine algorithm based on a plurality of training vectors, each training vector representing a respective classification, executing, using a quantum computing device, a linear equation solution algorithm on qubits of the quantum computing device based on the kernel matrix, and manipulating at least one of the qubits of the quantum computing device based on the plurality of training vectors. The method also comprises determining a measurement of a status of the at least one qubit, and classifying a test vector using a classical computing device based on the measurement.

A still further aspect of this disclosure provides apparatus for determining a kernel matrix for a support vector machine algorithm. The apparatus comprises a processor and a memory.

The memory contains instructions executable by the processor such that the apparatus is operable to manipulate quantum states of qubits of a quantum computing device based on a plurality of training vectors, each training vector representing a respective classification, determine a measurement of a status of at least one of the qubits, and compute the kernel matrix based on the measurement using a classical computing device.

An additional aspect of this disclosure provides apparatus for determining a kernel matrix for a support vector machine algorithm based on M training vectors, M≥2. The apparatus comprises a processor and a memory. The memory contains instructions executable by the processor such that the apparatus is operable to determine a partial trace of ρ, where $\rho=|\phi\rangle\langle\phi|$, and $$|\phi\rangle = \frac{1}{\sqrt{M}}\begin{bmatrix} \overline{(x_1)_1} \\ \overline{(x_1)_2} \\ \overline{(x_2)_1} \\ \overline{(x_2)_2} \\ \vdots \\ \overline{(x_M)_1} \\ \overline{(x_M)_2} \end{bmatrix},$$

where $\overline{(x_n)_1}$ and $\overline{(x_n)_2}$ are first and second dimensions respectively of training vector n, n=1, . . . M.

A further aspect of this disclosure provides apparatus for determining a kernel matrix for a support vector machine algorithm using a quantum computing device based on M training vectors, M≥2. The apparatus comprises a processor and a memory. The memory contains instructions executable by the processor such that the apparatus is operable to perform a respective rotation on the $n^{th}$ qubit of the quantum computing device by an $n^{th}$ angle based on an $n^{th}$ training vector of the training vectors, n=1, . . . , M, measure a respective state of each qubit to obtain M two-dimensional results $$\begin{bmatrix} \overline{(x_n)_1} \\ \overline{(x_n)_2} \end{bmatrix},$$

n=1, . . . , M, calculate the tensor product of all of the two-dimensional results $$\begin{bmatrix} \overline{(x_n)_1} \\ \overline{(x_n)_2} \end{bmatrix}$$

to obtain a vector:

$$|\psi\rangle = \begin{bmatrix} \overline{(x_1)_1} \\ \overline{(x_1)_2} \\ \overline{(x_2)_1} \\ \overline{(x_2)_2} \\ \vdots \\ \overline{(x_M)_1} \\ \overline{(x_M)_2} \end{bmatrix},$$

and determine the kernel matrix from a partial trace of matrix $$\frac{1}{M}|\psi\rangle\langle\psi|.$$

Another aspect of the present disclosure provides apparatus for classifying a test vector using a support vector machine algorithm. The apparatus comprises a processor and a memory. The memory contains instructions executable by the processor such that the apparatus is operable to determine a kernel matrix of the support vector machine algorithm based on a plurality of training vectors, each training vector representing a respective classification, execute, using a quantum computing device, a linear equation solution algorithm on qubits of the quantum computing device based on the kernel matrix, manipulate at least one of the qubits of the quantum computing device based on the plurality of training vectors, determine a measurement of a status of the at least one qubit, and classify a test vector using a classical computing device based on the measurement.

A further aspect of the present disclosure provides apparatus for determining a kernel matrix for a support vector machine algorithm. The apparatus is configured to manipulate quantum states of qubits of a quantum computing device based on a plurality of training vectors, each training vector representing a respective classification, determine a measurement of a status of at least one of the qubits, and compute the kernel matrix based on the measurement using a classical computing device.

A still further aspect of the present disclosure provides apparatus for determining a kernel matrix for a support vector machine algorithm based on M training vectors, M≥2. The apparatus is configured to determine a partial trace of ρ, where $\rho=|\phi\rangle\langle\phi|$, and $$|\phi\rangle = \frac{1}{\sqrt{M}}\begin{bmatrix} \overline{(x_1)_1} \\ \overline{(x_1)_2} \\ \overline{(x_2)_1} \\ \overline{(x_2)_2} \\ \vdots \\ \overline{(x_M)_1} \\ \overline{(x_M)_2} \end{bmatrix},$$

where $\overline{(x_n)_1}$ and $\overline{(x_n)_2}$ are first and second dimensions respectively of training vector n, n=1, . . . , M.

An additional aspect of the present disclosure provides apparatus for determining a kernel matrix for a support vector machine algorithm using a quantum computing device based on M training vectors, M≥2. The apparatus is configured to perform a respective rotation on the $n^{th}$ qubit of the quantum computing device by an $n^{th}$ angle based on an $n^{th}$ training vector of the training vectors, n=1, . . . , M, measure a respective state of each qubit to obtain M two-dimensional results $$\begin{bmatrix} \overline{(x_n)_1} \\ \overline{(x_n)_2} \end{bmatrix},$$

n=1, . . . , M, calculate the tensor product of all of the two-dimensional results $$\begin{bmatrix} \overline{(x_n)_1} \\ \overline{(x_n)_2} \end{bmatrix}$$

to obtain a vector:

$$|\psi\rangle = \begin{bmatrix} \overline{(x_1)_1} \\ \overline{(x_1)_2} \\ \overline{(x_2)_1} \\ \overline{(x_2)_2} \\ \vdots \\ \overline{(x_M)_1} \\ \overline{(x_M)_2} \end{bmatrix},$$

and determine the kernel matrix from a partial trace of matrix $$\frac{1}{M}|\psi\rangle\langle\psi|.$$

Another aspect of the present disclosure provides apparatus for classifying a test vector using a support vector machine algorithm. The apparatus is configured to determine a kernel matrix of the support vector machine algorithm based on a plurality of training vectors, each training vector representing a respective classification, execute, using a quantum computing device, a linear equation solution algorithm on qubits of the quantum computing device based on the kernel matrix, manipulate at least one of the qubits of the quantum computing device based on the plurality of training vectors, determine a measurement of a status of the at least one qubit, and classify a test vector using a classical computing device based on the measurement.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Quantum computing devices may be performance-limited by the coherence time of the qubits. This, in turn, implies that only short depth circuits can be executed. Quantum circuit simulators may also be executed on classical computing devices to simulate the quantum algorithms, but they are also limited in processing power by the bit limitation of the classical computing devices.

Figure 1:
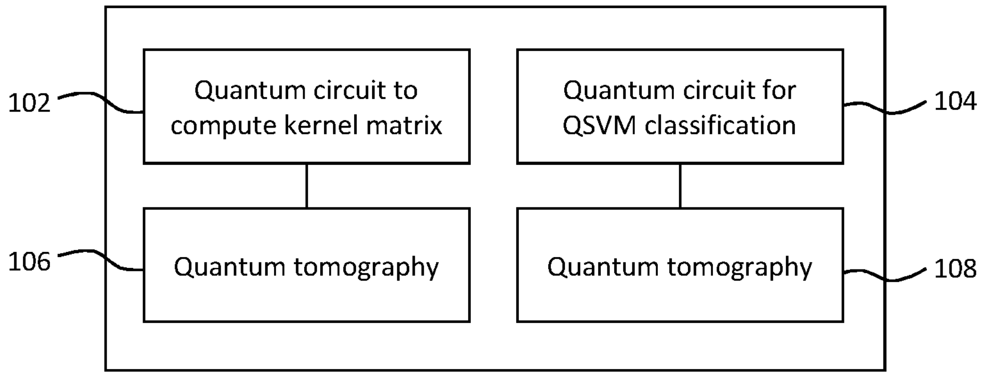
FIG. 1 shows an example of a quantum support vector machine (QSVM) algorithm.

The QSVM system 100 shown in FIG. 1 has several drawbacks. For example, the quantum circuit 102 for generating the kernel matrix K can only deal with two training vectors as input. If there are more than two training vectors, the complexity of circuit will be increased. Additionally, the quantum tomography 106 will also increase the circuit depth. In the classification part, comprising the quantum circuit 104 and quantum tomography 108, to classify multiple test (data) vectors, the matrix inversion, training and test parts of the quantum circuit 104 (e.g. of the quantum circuit 300 shown in FIG. 3) needs to be executed. This results in considerable redundant computation, particularly for a large number of test vectors.

Methods and apparatus disclosed herein propose to improve both the kernel matrix computation part and the classification part of a support vector machine (SVM). In the proposed solution, we provide methods to improve both Part 1 and Part 2 of the original QSVM system. For example, in some embodiments, proposed herein is a classical method for result readout after the quantum circuit 200 in FIG. 2 for determining the kernel matrix, such that the quantum tomography technique (e.g. block 106 of FIG. 1) is not used. Also proposed is a purely classical method for determining the kernel matrix of a quantum support vector machine (QSVM), and this method can be generalized for calculating a kernel matrix with $2^n$ training data (n is a positive integer). Also proposed is a quantum circuit that can be used for calculation of a kernel matrix, which may in some examples have a reduced depth compared to the circuit of FIG. 2. In some embodiments, also proposed herein is a classification process. Instead of running the matrix inversion, training and testing parts of the quantum circuit for each test vector to be classified, parameters (e.g. the parameters of the classification boundary) determined after executing the matrix inversion and training parts once may be used repeatedly in a classical method of classifying test vectors. Thus, the redundancy may be significantly reduced. Embodiments disclosed herein may provide a hybrid quantum and classical computing system for implementing a QSVM, which may for example reduce the redundancy in the current training and testing quantum circuit, and may for example shorten execution time on quantum circuit simulators. Embodiments proposed herein may reduce the quantum circuit depth and thus lead to a greater chance of successful execution using a quantum computing device.

Figure 4:
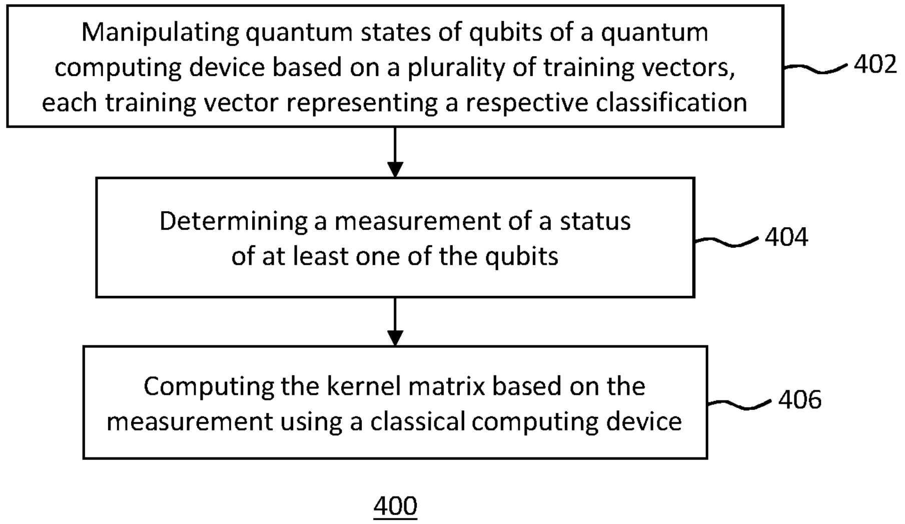
FIG. 4 is a flow chart of an example of a method of determining a kernel matrix for a support vector machine algorithm using a quantum computing device without quantum tomography.

FIG. 4 is a flow chart of an example of a method 400 of determining a kernel matrix for a support vector machine algorithm using a quantum computing device without quantum tomography. The method 400 comprises, in step 402, manipulating quantum states of qubits of a quantum computing device based on a plurality of training vectors, each training vector representing a respective classification. For example, one or more of the qubits may be rotated based on a first angle associated with a first training vector, and a second angle associated with a second training vector. Each training vector is associated with or represents a respective classification, in that a test vector may be classified such that for example it is nearest to the first or second training vector. In some examples, the quantum computing device comprises or implements the quantum circuit 200 shown in FIG. 2, however quantum tomography is not used to determine the kernel matrix K from the quantum circuit 200.

Figure 2:
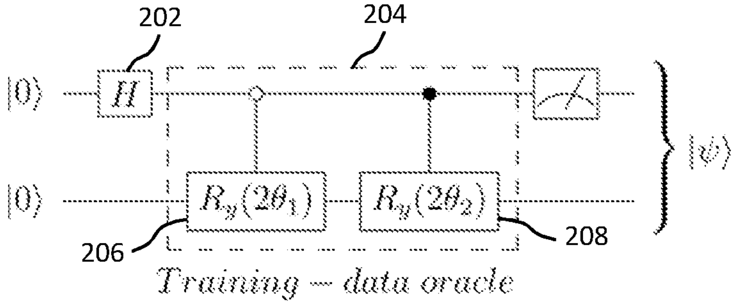
FIG. 2 shows an example of a quantum circuit to compute a kernel matrix for a QSVM algorithm.

Step 404 of the method 400 comprises determining a measurement of a status of at least one of the qubits. For example, a measurement of the status $|\Psi\rangle$ of both qubits of the quantum circuit 200 shown in FIG. 2 is determined. Next, step 406 of the method 400 comprises computing the kernel matrix based on the measurement using a classical computing device.

In some examples, manipulating quantum states of the qubits comprises performing first and second conditional rotations. For example, a first conditional rotation may be performed on a first qubit of the qubits by a first angle based on a first training vector of the plurality of training vectors, wherein the first conditional rotation is conditional based on the state of a second qubit of the qubits. For example, the first conditional rotation may be based on an angle $\theta_1$ associated with the first training vector (for example where the first training vector is represented by polar coordinates). Additionally, a second conditional rotation is performed on the first qubit by a second angle based on a second training vector of the plurality of training vectors, wherein the second conditional rotation is conditional based on the state of the second qubit. For example, the second conditional rotation may be based on an angle $\theta_2$ associated with the second training vector (for example where the second training vector is represented by polar coordinates). In some examples, the first and second training vectors are normalised or unit-length vectors.

In some examples, the measurement of the status of at least one of the qubits comprises measuring $|\Psi\rangle=\alpha_0|00\rangle+\alpha_1|01\rangle+\alpha_2|10\rangle+\alpha_3|11\rangle$, where $|\Psi\rangle$ is the status of two of the qubits (such as for example the qubits of the quantum circuit 200 shown in FIG. 2). $\alpha_0$ is a coefficient of the status of the qubits being $|00\rangle$, $\alpha_1$ is a coefficient of the status of the qubits being $|01\rangle$, $\alpha_2$ is a coefficient of the status of the qubits being $|10\rangle$ and $\alpha_3$ is a coefficient of the status of the qubits being $|11\rangle$. The coefficients (or weights) may in some examples be related to their probabilities $p_i$ such that $p_i=\alpha_i^2$, i=0, . . . , 3.

In some examples, computing the kernel matrix based on the measurement using a classical computing device comprises calculating the kernel matrix K such that:

$$K = \left(|\alpha_0|^2 + |\alpha_2|^2\right)\begin{bmatrix}\overline{\alpha_0}\\ \overline{\alpha_2}\end{bmatrix}\begin{bmatrix}\overline{\alpha_0} & \overline{\alpha_2}\end{bmatrix} + \left(|\alpha_1|^2 + |\alpha_3|^2\right)\begin{bmatrix}\overline{\alpha_1}\\ \overline{\alpha_3}\end{bmatrix}\begin{bmatrix}\overline{\alpha_1} & \overline{\alpha_3}\end{bmatrix} = p_0|\psi_0\rangle\langle\psi_0| + p_1|\psi_1\rangle\langle\psi_1|$$

where $p_0$ is defined as $|\alpha_0|^2+|\alpha_2|^2$; $p_1$ is defined as $|\alpha_1|^2+|\alpha_3|^2$; $|\Psi_0\rangle$ is defined as $$\begin{bmatrix} \overline{\alpha_0} \\ \overline{\alpha_2} \end{bmatrix};$$

and $|\Psi_1\rangle$ is defined as $$\begin{bmatrix} \overline{\alpha_1} \\ \overline{\alpha_3} \end{bmatrix}.$$

Thus, the kernel matrix K can be determined based on the status $|\Psi\rangle$ of the two of the qubits, such as for example the status of the qubits of the quantum circuit 200 of FIG. 2. In some examples, $|\overline{\alpha_0}|^2+|\overline{\alpha_2}|^2=1$ and $|\overline{\alpha_1}|^2+|\overline{\alpha_3}|^2=1$ (e.g. these are normalized amplitudes).

In some examples, the kernel matrix K is determined such that:

$$\begin{bmatrix} 0 & \vec{1}^T \\ \vec{1} & K+\gamma^{-1}1 \end{bmatrix} \begin{bmatrix} b \\ \vec{\alpha} \end{bmatrix} = \begin{bmatrix} 0 \\ \vec{y} \end{bmatrix}$$

where K is a matrix of dimension M×M, M is the number of training vectors, $\gamma$ is a user-specified tuning parameter (an example value is $\gamma=2$), $\vec{\alpha}$ forms a normal vector $\vec{w}$ by $\vec{w}=$ $$\sum_{j=1}^{M} \alpha_j \vec{x}_j,\ \vec{x}_j$$

is a N-dimensional test vector, $y_j$ is a label of $\vec{x}_j$, and the classification decision boundary line $y=\vec{w}x+b$. For example, $\vec{y}$ stores the labels of training vectors (e.g. +1 and −1) and are known, and the purpose is to calculate b and $\alpha$. With $\alpha$, $\vec{w}$ can be calculated. Thus, the decision boundary of classification can be represented by a line $y=\vec{w}x+b$.

Thus, $\vec{w}$ and b can in some examples be considered as parameters of the classification decision boundary (NB. y is not the same as $\vec{y}$).

Instead of using the quantum circuit 200 as depicted in FIG. 2, other embodiments of this disclosure may use a pure classical method for generating the kernel matrix K, e.g. implemented using a classical computing device, which is mathematically proven to have the same or similar result as embodiments that use a quantum circuit such as that shown in FIG. 2, where there are two training vectors. This pure classical method can also generate matrix K using $N=2^n$ training data, where n is a positive integer.

When there are two training vectors, the density matrix of both qubits in FIG. 2 can be classically calculated by $\rho=|\phi\rangle\langle\phi|$, where $|\phi\rangle$ is defined as:

$$|\phi\rangle = \frac{1}{\sqrt{2}} \begin{bmatrix} \overline{(x_1)_1} \\ \overline{(x_1)_2} \\ \overline{(x_2)_1} \\ \overline{(x_2)_2} \end{bmatrix}$$

where $|\overline{(x_1)_1}$ and $\overline{(x_1)_2}$ are the normalized form of the first and second dimensions (e.g. Cartesian coordinates) of the training vectors, that satisfy $|\overline{(x_1)_1}|^2+|\overline{(x_1)_2}|^2=1$. The kernel matrix K can be calculated by the partial trace of $\rho$.

Figure 5:
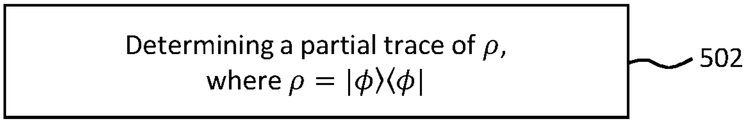
FIG. 5 is a flow chart of an example of a method of determining a kernel matrix for a support vector machine algorithm.

FIG. 5 is a flow chart of an example of a method 500 of determining a kernel matrix for a support vector machine algorithm based on M training vectors, M≥2. The method 500 may be performed or implemented on a classical computing device. The method 500 comprises, in step 502, determining a partial trace of $\rho$, where $\rho=|\phi\rangle\langle\phi|$, and $$|\phi\rangle = \frac{1}{\sqrt{M}} \begin{bmatrix} \overline{(x_1)_1} \\ \overline{(x_1)_2} \\ \overline{(x_2)_1} \\ \overline{(x_2)_2} \\ \vdots \\ \overline{(x_M)_1} \\ \overline{(x_M)_2} \end{bmatrix},$$

which is the generalisation of the expression for $|\phi\rangle$ where there are two or more training vectors. $|\overline{(x_1)_1}$ and $\overline{(x_1)_2}$ are first and second (e.g. Cartesian) dimensions respectively of training vector n, n=1, . . . , M. In some examples, where subsequent steps such as classification or matrix inversion and training are performed using a quantum computing device, using a classical method for calculating the kernel matrix may reduce the overall complexity of the system.

Figure 6:
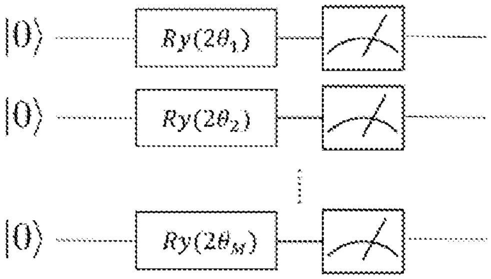
FIG. 6 shows a quantum circuit that can be used for determining the kernel matrix.
Figure 7:
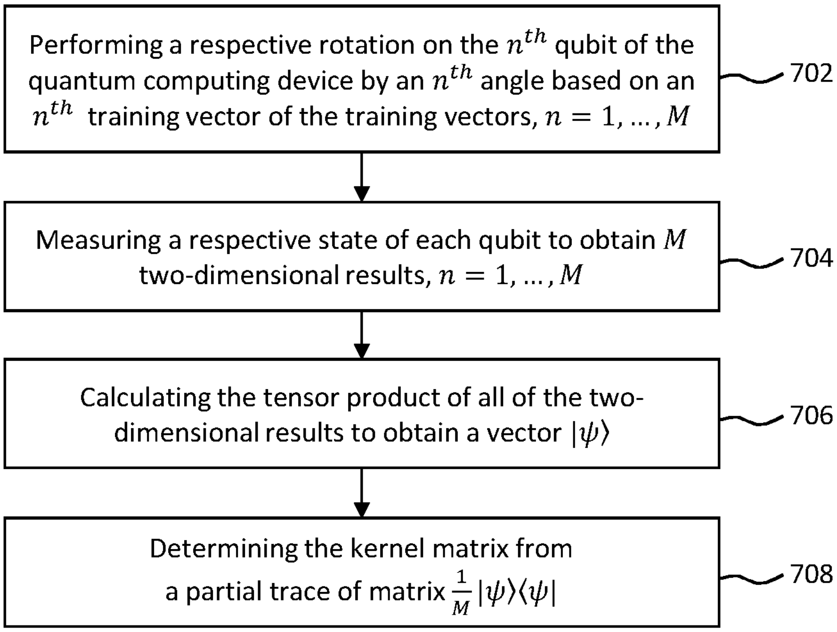
FIG. 7 is a flow chart of an example of a method of determining a kernel matrix for a support vector machine algorithm using a quantum computing device.

An alternative quantum circuit 600 that can be used for determining the kernel matrix is shown in FIG. 6. The circuit 600 includes M qubits, and can be used with M training vectors, each associated with an angle $\theta_n$, n=1, . . . , M. FIG. 7 is a flow chart of an example of a method 700 of determining a kernel matrix for a support vector machine algorithm using a quantum computing device (e.g. the device 600 shown in FIG. 7) based on M training vectors. The method 700 comprises, in step 702, performing a respective rotation on the $n^{th}$ qubit of the quantum computing device by an $n^{th}$ angle based on an $n^{th}$ training vector of the training vectors, n=1, . . . , M. Step 704 of the method 700 comprises measuring a respective state of each qubit to obtain M two-dimensional results $$\begin{bmatrix} \overline{(x_n)_1} \\ \overline{(x_n)_2} \end{bmatrix},$$

n=1, . . . , M. Step 706 comprises calculating the tensor product of all of the two-dimensional results $$\begin{bmatrix} \overline{(x_n)_1} \\ \overline{(x_n)_2} \end{bmatrix}$$

to obtain a vector:

$$|\psi\rangle = \begin{bmatrix} \overline{(x_1)_1} \\ \overline{(x_1)_2} \\ \overline{(x_2)_1} \\ \overline{(x_2)_2} \\ \vdots \\ \overline{(x_M)_1} \\ \overline{(x_M)_2} \end{bmatrix}$$

Finally, step 708 of the method 700 comprises determining the kernel matrix from a partial trace of matrix $$\frac{1}{M}|\psi\rangle\langle\psi|.$$

Thus the kernel matrix can be determined using a quantum circuit with less depth than the circuit 200 shown in FIG. 2, for example. In some examples, steps 702 and/or 704 may be implemented on or performed using a quantum computing device, and 706 and/or 708 may be implemented on or performed using a classical computing device.

Figure 3:
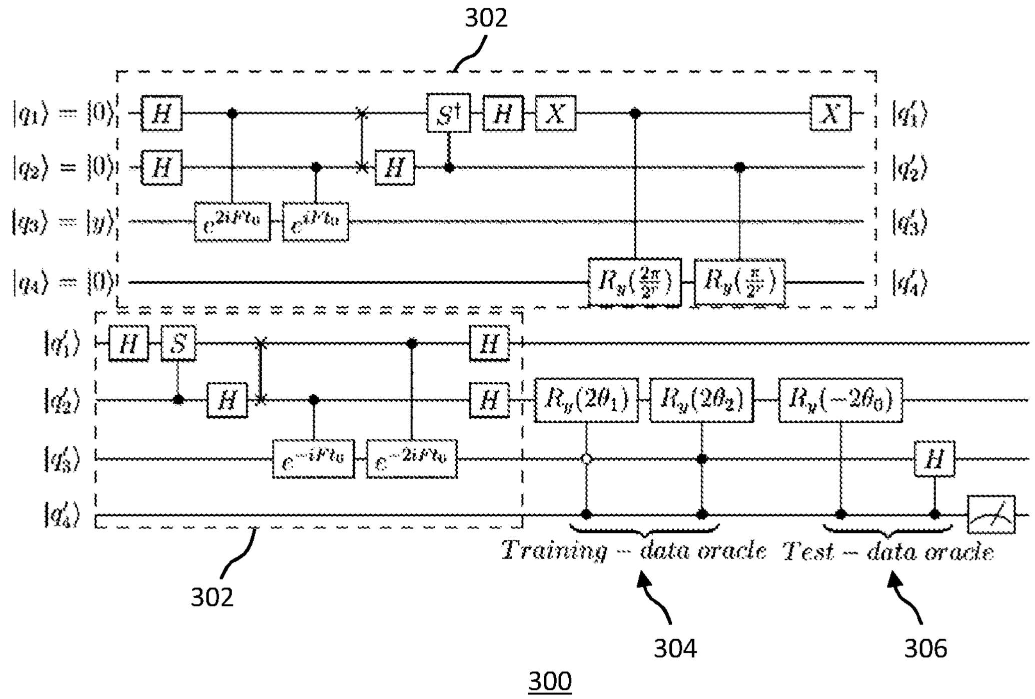
FIG. 3 shows an example of a quantum circuit for QSVM classification.

The QSVM classification quantum circuit 300 shown in FIG. 3 from reference [2] consists of three parts as follows: the matrix inversion part 302, the training data oracle 304 and the test data (test vector) oracle 306. The quantum circuit 300 consists of four qubits: the first and second qubits $|q_1\rangle$ and $|q_2\rangle$ stand for the clock register, and both are initialized as $|0\rangle$; the third qubit $|q_3\rangle$ is the input register to store the labels of two training vectors, corresponding to classifications of +1 and −1. Thus, this qubit is initialized as $$|y\rangle = \frac{|0\rangle - |1\rangle}{\sqrt{2}}.$$

The fourth qubit $|q_4\rangle$ is the ancilla register, and has the final the value of $|1\rangle$ if the matrix inversion part 302 has a solution and $|0\rangle$ otherwise, and it is also initialized as $|0\rangle$.

The matrix inversion part 300 and the training data oracle part 304 of the circuit 300 represent the training part of the circuit. It is designed to determine for example the hyperplane that can separate the data points into two sub-groups based on the training vectors. The test data oracle 306 represents the testing part of the circuit.

When using this quantum circuit 300, for every test vector (test data to be classified), the whole quantum circuit 300 needs to be executed. Thus, if in total there are m test data points, both the training part (including the matrix inversion and training data oracle parts) and the testing part need to be executed m times, and there is a lot of redundancy. The total circuit depth is (20+2)×m=22 m.

Figure 8:
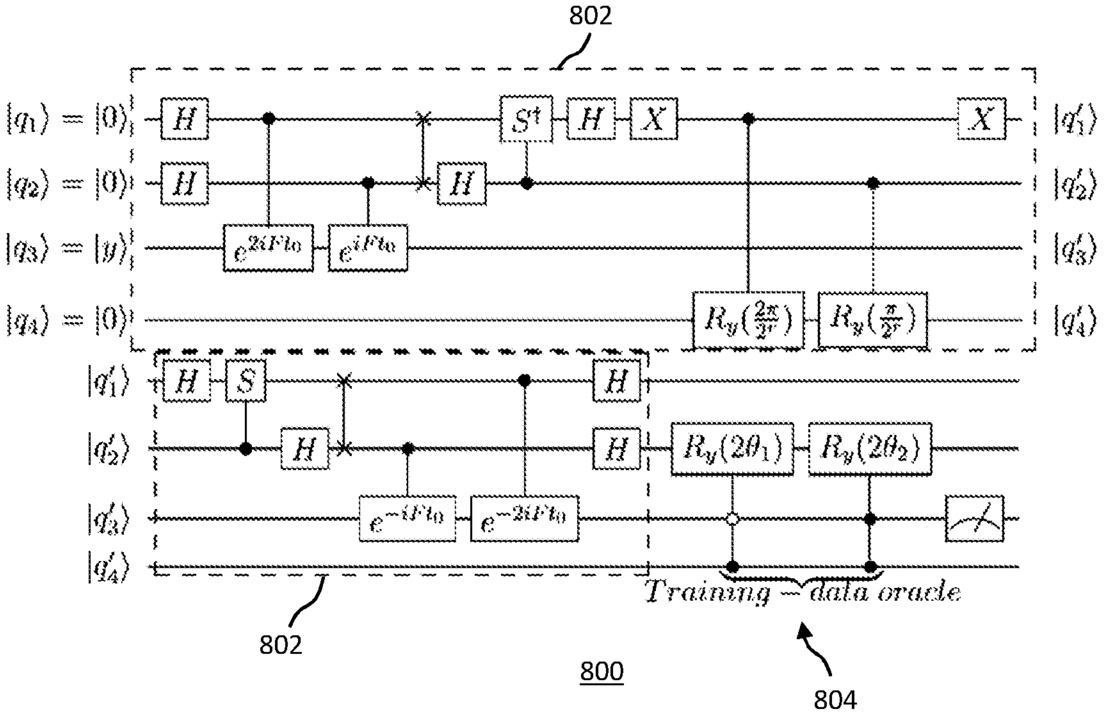
FIG. 8 is an example of a quantum circuit that includes a matrix inversion part and training data oracle.

In embodiments as proposed herein, a process of testing is disclosed that has reduced the redundancy compared to the testing process using the quantum circuit 300. FIG. 8 is an example of a quantum circuit 800 that includes a matrix inversion part 802 and training data oracle 804, and thus includes a training part. However, the circuit 800 does not include a test data oracle. In some embodiments, the circuit 800 is executed just once, and the results can be used to classify multiple test vectors using a classical computing device. The total quantum circuit depth is 20, which is 99% reduced for example compared to using the quantum circuit 300 when the number of testing data m is to 100.

Figure 9:
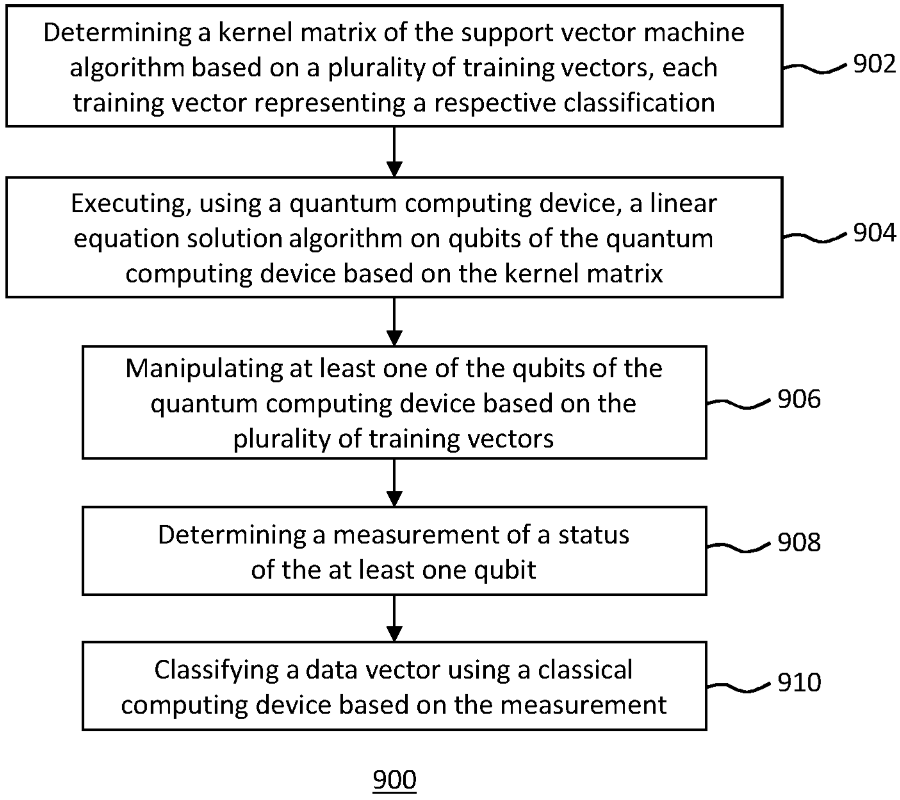
FIG. 9 is a flow chart of an example of a method method of classifying a test vector using a support vector machine algorithm.

FIG. 9 is a flow chart of an example of a method method 900 of classifying a test vector using a support vector machine algorithm. The method comprises, in step 902, determining a kernel matrix of the support vector machine algorithm based on a plurality of training vectors, each training vector representing a respective classification. This may be performed using any suitable method, including determining the kernel matrix K using any method disclosed herein, such as for example the method 400 of FIG. 4 or the method 500 of FIG. 5. Step 904 of the method 900 comprises executing, using a quantum computing device, a linear equation solution algorithm on qubits of the quantum computing device based on the kernel matrix, and in step 906, manipulating at least one of the qubits of the quantum computing device based on the plurality of training vectors. In some examples, steps 904 and 906 may be implemented using a quantum circuit such as for example the quantum circuit 800 shown in FIG. 8.

Step 908 of the method 900 comprises determining a measurement of a status of the at least one qubit, and step 910 comprises classifying a test vector using a classical computing device based on the measurement. In some examples, the method 900 also includes classifying one or more further test vectors based on the measurement (e.g. repeating step 910 for one or more further test vectors). This can be done for example without repeating the executing and manipulating steps, i.e. without repeating one or more of steps 902-908 of the method 900.

In some examples, determining the measurement of the status of the at least one qubit comprises determining a measurement of the status of four qubits of the quantum computing device. These may be for example qubits $|q_1\rangle$ to $|q_4\rangle$ of the quantum circuit 800 shown in FIG. 8. Determining the measurement of the status of the four qubits of the quantum computing device may then comprise determining estimates of $\alpha_0, \alpha_1, \ldots, \alpha_{15}$, where $\alpha_0, \alpha_1, \ldots, \alpha_{15}$ comprise coefficients (or weights) of quantum orthonormal bases $|0000\rangle, |0001\rangle, \ldots, |1111\delta$ respectively of the four qubits (e.g. after the quantum circuit 800 has been run or executed). Classifying a test vector using a classical computing device based on the measurement may then in some examples comprises determining $\alpha_1$ and $\alpha_2$. In some examples, $\alpha_1$ is the sum of coefficients of the quantum states that the most significant qubit is zero, and $_2$ is the sum of coefficients of the quantum states that the most significant qubit is one. In the four qubit example circuit 800 in FIG. 8, the most significant qubit is the third qubit, which is in some examples the qubit to be measured. In some examples:

$$\alpha_1 = a_0 + a_1 + a_4 + a_5 + a_8 + a_9 + a_{12} + a_{13}, \text{ and}$$

$$\alpha_2 = a_2 + a_3 + a_6 + a_7 + a_{10} + a_{11} + a_{14} + a_{15};$$

Classifying a test vector using a classical computing device based on the measurement may also comprise determining a classification $y(\vec{x_0})$ of the test vector, where:

$$y(\vec{x_0}) = \text{sign}\left(\sum_{i=1}^{M} \alpha_i(\vec{x_i} \cdot \vec{x_0}) + b\right),$$

$\vec{x_0}$ is the test vector, $\vec{x_i}$, i=1, . . . , M are the M training vectors;

b is 0, or an offset of a decision boundary between first and second classifications for the test vector; and

M=2.

Thus, for each of the M test vectors (test test vectors), a respective classification result +1 or −1 can be determined. The sign( )function is defined in some examples as:

$$\text{sign}(x) = \begin{cases} 1 & \text{if } x \geq 0 \\ -1 & \text{if } x < 0 \end{cases}$$

Figure 10:
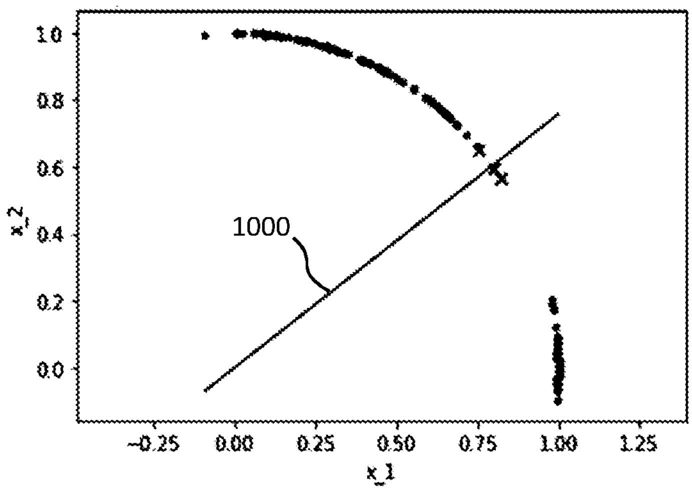
FIG. 10 shows example results of a classification process for a plurality of test vectors.

Example results of a classification process for a plurality of test vectors are shown in FIG. 10. In some examples, the training process (e.g. matrix inversion followed by training data oracle) may determine a separation line or plane 1000 between classification regions. In the example shown in FIG. 10, test vectors falling on one side of the line 1000 are classified in a first classification (e.g. +1), whereas test vectors falling on the other side of the line 1000 are classified in a second classification (e.g. −1). The test vectors have a first (e.g. Cartesian) dimension x_1 represented on the x-axis, and a second (e.g. Cartesian) dimension represented on the y-axis.

Figure 11:
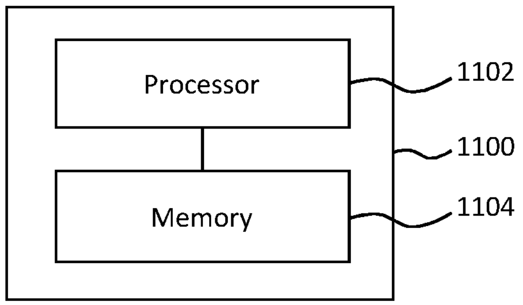
FIG. 11 is a schematic of an example of apparatus for determining a kernel matrix for a support vector machine algorithm.

FIG. 11 is a schematic of an example of apparatus 1100 for determining a kernel matrix for a support vector machine algorithm. The apparatus 1100 comprises processing circuitry 1102 (e.g. one or more processors) and a memory 1104 in communication with the processing circuitry 1102. The memory 1104 contains instructions executable by the processing circuitry 1102. In one embodiment, the memory 1104 contains instructions executable by the processing circuitry 1102 such that the apparatus 1100 is operable to manipulate quantum states of qubits of a quantum computing device based on a plurality of training vectors, each training vector representing a respective classification, determine a measurement of a status of at least one of the qubits, and compute the kernel matrix based on the measurement using a classical computing device. In some examples, the memory 1104 contains instructions executable by the processing circuitry 1102 such that the apparatus 1100 is operable to carry out the method 400 shown in FIG. 4 and/or described above.

Figure 12:
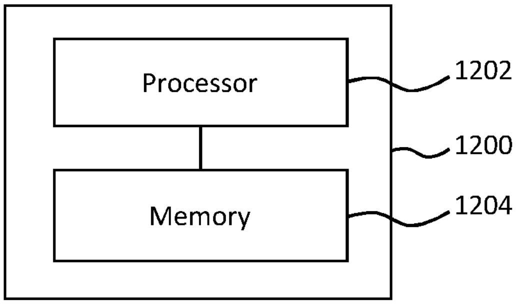
FIG. 12 is a schematic of an example of apparatus 1000 for determining a kernel matrix for a support vector machine algorithm.

FIG. 12 is a schematic of an example of apparatus 1200 for determining a kernel matrix for a support vector machine algorithm based on M training vectors, M≥2. The apparatus 1200 comprises processing circuitry 1202 (e.g. one or more processors) and a memory 1204 in communication with the processing circuitry 1202. The memory 1204 contains instructions executable by the processing circuitry 1202. In one embodiment, the memory 1204 contains instructions executable by the processing circuitry 1202 such that the apparatus 1200 is operable to determine a partial trace of ρ, where ρ=|ϕ⟩⟨ϕ|, and $$|\phi\rangle = \frac{1}{\sqrt{2^n}}\begin{bmatrix} \overline{(x_1)_1} \\ \overline{(x_1)_2} \\ \overline{(x_2)_1} \\ \overline{(x_2)_2} \\ \vdots \\ \overline{(x_M)_1} \\ \overline{(x_M)_2} \end{bmatrix},$$

where $\overline{(x_n)_1}$ and $\overline{(x_n)_2}$ are first and second dimensions respectively of training vector n, n=1, . . . , M. In some examples, the memory 1204 contains instructions executable by the processing circuitry 1202 such that the apparatus 1200 is operable to carry out the method 500 shown in FIG. 5 and/or described above.

Figure 13:
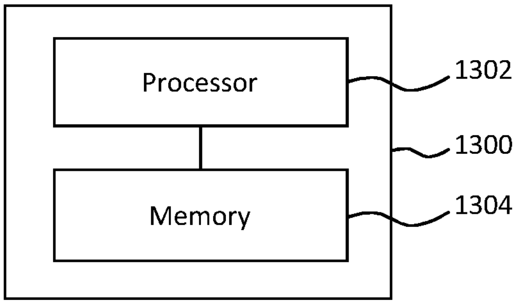
FIG. 13 is a schematic of an example of apparatus 1300 for determining a kernel matrix for a support vector machine algorithm using a quantum computing device.

FIG. 13 is a schematic of an example of apparatus 1300 for determining a kernel matrix for a support vector machine algorithm using a quantum computing device based on M training vectors, M≥2. The apparatus 1300 comprises processing circuitry 1302 (e.g. one or more processors) and a memory 1304 in communication with the processing circuitry 1302. The memory 1304 contains instructions executable by the processing circuitry 1302. In one embodiment, the memory 1304 contains instructions executable by the processing circuitry 1302 such that the apparatus 1300 is operable to perform a respective rotation on the $n^{th}$ qubit of the quantum computing device by an $n^{th}$ angle based on an $n^{th}$ training vector of the training vectors, n=1, M, measure a respective state of each qubit to obtain M two-dimensional results $$\begin{bmatrix} \overline{(x_n)_1} \\ \overline{(x_n)_2} \end{bmatrix},$$

n=1, . . . , M, calculate the tensor product of all of the two-dimensional results $$\begin{bmatrix} \overline{(x_n)_1} \\ \overline{(x_n)_2} \end{bmatrix}$$

to obtain a vector:

$$|\psi\rangle = \begin{bmatrix} \overline{(x_1)_1} \\ \overline{(x_1)_2} \\ \overline{(x_2)_1} \\ \overline{(x_2)_2} \\ \vdots \\ \overline{(x_M)_1} \\ \overline{(x_M)_2} \end{bmatrix},$$

and determine the kernel matrix from a partial trace of matrix $$\frac{1}{M}|\psi\rangle\langle\psi|.$$

Figure 14:
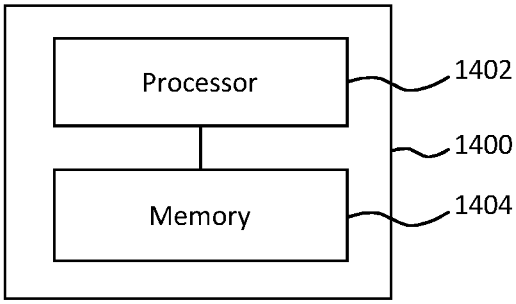
FIG. 14 is a schematic of an example of apparatus 1100 for classifying a test vector using a support vector machine algorithm.

FIG. 14 is a schematic of an example of apparatus 1400 for classifying a test vector using a support vector machine algorithm. The apparatus 1400 comprises processing circuitry 1402 (e.g. one or more processors) and a memory 1404 in communication with the processing circuitry 1402. The memory 1404 contains instructions executable by the processing circuitry 1402. In one embodiment, the memory 1404 contains instructions executable by the processing circuitry 1402 such that the apparatus 1400 is operable to determine a kernel matrix of the support vector machine algorithm based on a plurality of training vectors, each training vector representing a respective classification, execute, using a quantum computing device, a linear equation solution algorithm on qubits of the quantum computing device based on the kernel matrix, manipulate at least one of the qubits of the quantum computing device based on the plurality of training vectors, determine a measurement of a status of the at least one qubit, and classify a test vector using a classical computing device based on the measurement. In some examples, the memory 1404 contains instructions executable by the processing circuitry 1402 such that the apparatus 1400 is operable to carry out the method 900 shown in FIG. 9 and/or described above.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim or embodiment, "a" or "an" does not exclude a plurality, and a single processor or other unit may fulfil the functions of several units recited in the statements below. Where the terms, "first", "second" etc are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

REFERENCES

The following references are incorporated herein by reference.

[1] Lloyd, Seth. "Quantum algorithm for solving linear systems of equations." APS March Meeting Abstracts. 2010.

[2] Li, Zhaokai, et al. "Experimental realization of a quantum support vector machine." Physical review letters 114.14 (2015): 140504.

[3] Nielsen, Michael A., and Isaac Chuang. "Quantum computation and quantum information." (2002): 558-559. p.389-394

[4] Thew R T, Nemoto K, White A G, et al. Qudit quantum-state tomography[J]. Physical Review A, 2002, 66(1): 012303.

[5] Qiskit—Quantum Tomography Module, https://qiskit.org/documentation/autodoc/qiskit.tools.qcvv.tomography.html, Accessed Jun. 11, 2019

[6] Coles, Patrick J. et al, "Quantum Algorithm Implementations for Beginners." arXiv:1804.03719 v1, 10 Apr. 2018

The invention claimed is:

1. A method of determining a kernel matrix for a support vector machine algorithm using a quantum computing device without quantum tomography, the method comprising:

manipulating quantum states of qubits of a quantum computing device based on a plurality of training vectors, each training vector representing a respective classification;

determining a measurement of a status of at least one of the qubits, wherein determining the measurement of the status of the at least one of the qubits comprises measuring $|\Psi\rangle=\alpha_0|00\rangle+\alpha_1|01\rangle+\alpha_2|10\rangle+\alpha_3|11\rangle$, where $|\Psi\rangle$ is the status of two of the qubits, $\alpha_0$ is a coefficient of the status of the qubits being $|00\rangle$, $\alpha_1$ is a coefficient of the status of the qubits being $|01\rangle$, $\alpha_2$ is a coefficient of the status of the qubits being $|10\rangle$, and $\alpha_3$ is a coefficient of the status of the qubits being $|11\rangle$, and wherein each coefficient is equivalent to a square of a corresponding probability of the qubits being measured in that status; and computing the kernel matrix based on the measurement using a classical computing device, wherein the computing the kernel matrix based on the measurement using a classical computing device comprises calculating a kernel matrix K such that:

$$K=\left(|\alpha_0|^2+|\alpha_2|^2\right)\begin{bmatrix}\overline{\alpha_0}\\ \overline{\alpha_2}\end{bmatrix}\begin{bmatrix}\overline{\alpha_0} & \overline{\alpha_2}\end{bmatrix}+\left(|\alpha_1|^2+|\alpha_3|^2\right)\begin{bmatrix}\overline{\alpha_1}\\ \overline{\alpha_3}\end{bmatrix}\begin{bmatrix}\overline{\alpha_1} & \overline{\alpha_3}\end{bmatrix}=p_0|\psi_0\rangle\langle\psi_0|+p_1|\psi_1\rangle\langle\psi_1|$$

where:

$p_0$ is defined as $|\alpha_0|^2+|\alpha_2|^2$;

$p_1$ is defined as $|\alpha_1|^2+|\alpha_3|^2$;

$\overline{\alpha_0}$, $\overline{\alpha_1}$, $\overline{\alpha_2}$, and $\overline{\alpha_3}$ are normalized amplitudes of coefficients of the bases of the orthonormal basis of a quantum circuit, wherein the state of the quantum circuit is written as $|\Psi\rangle=\alpha_0|00\rangle+\alpha_1|01\rangle+\alpha_2|10\rangle+\alpha_3|11\rangle$;

$|\psi_0\rangle$ is defined as $\begin{bmatrix}\overline{\alpha_0}\\ \overline{\alpha_2}\end{bmatrix}$; and $|\psi_1\rangle$ is defined as $\begin{bmatrix}\overline{\alpha_1}\\ \overline{\alpha_3}\end{bmatrix}$.

2. The method of claim 1, wherein the manipulating quantum states of the qubits comprises:

performing a first conditional rotation on a first qubit of the qubits by a first angle based on a first training vector of the plurality of training vectors, wherein the first conditional rotation is conditional based on a state of a second qubit of the qubits; and performing a second conditional rotation on the first qubit by a second angle based on a second training vector of the plurality of training vectors, wherein the second conditional rotation is conditional based on the state of the second qubit.

3. The method of claim 1, wherein $|\alpha_0|^2+|\alpha_2|^2=1$ and $|\alpha_1|^2+|\alpha_3|^2=1$.

4. The method of claim 1, wherein the kernel matrix K is determined such that:

$$\begin{bmatrix}0 & \vec{1}^T\\ \vec{1} & K+\gamma^{-1}1\end{bmatrix}\begin{bmatrix}b\\ \vec{\alpha}\end{bmatrix}=\begin{bmatrix}0\\ \vec{y}\end{bmatrix}$$

where:

K is a matrix of dimension M×M, where M is a number of training vectors;

$\gamma$ is a user-specified tuning parameter;

$\vec{\alpha}$ forms a normal vector $\vec{w}$ by $$\vec{w}=\sum_{j=1}^{M}\alpha_j\vec{x}_j;$$

$\alpha_j$ is a coefficient of the j-th basis element of an orthonormal basis of the state of the quantum circuit;

$\vec{x}_j$, is a N-dimensional test vector;

$\vec{y}$ stores labels of the training vectors;

$y_j$ is a label of $\vec{x}_j$; and a decision boundary $y=\vec{w}x+b$; and wherein b is 0, or an offset of the decision boundary between first and second classifications for the test vector.

5. A method of classifying a test vector using a support vector machine algorithm, the method comprising:

determining a kernel matrix of the support vector machine algorithm based on a plurality of training vectors, each training vector representing a respective classification;

executing, using a quantum computing device, a linear equation solution algorithm on qubits of the quantum computing device based on the kernel matrix;

manipulating at least one of the qubits of the quantum computing device based on the plurality of training vectors;

determining a measurement of a status of the at least one qubit, wherein determining the measurement of the status of the at least one qubit comprises measuring $|\Psi\rangle=\alpha_0|00\rangle+\alpha_1|01\rangle+\alpha_2|10\rangle+\alpha_3|11\rangle$, where $|\Psi\rangle$ is the status of two of the qubits, $\alpha_0$ is a coefficient of the status of the qubits being $|00\rangle$, $\alpha_1$ is a coefficient of the status of the qubits being $|01\rangle$, $\alpha_2$ is a coefficient of the status of the qubits being $|10\rangle$, and $\alpha_3$ is a coefficient of the status of the qubits being $|11\rangle$, and wherein each coefficient is equivalent to a square of a corresponding probability of the qubits being measured in that status;

computing the kernel matrix based on the measurement using a classical computing device, wherein the computing the kernel matrix based on the measurement using a classical computing device comprises calculating the kernel matrix K such that:

$$K = \left(|\alpha_0|^2 + |\alpha_2|^2\right)\begin{bmatrix}\overline{\alpha_0}\\ \overline{\alpha_2}\end{bmatrix}[\overline{\alpha_0}\ \ \overline{\alpha_2}] + \left(|\alpha_1|^2 + |\alpha_3|^2\right)\begin{bmatrix}\overline{\alpha_1}\\ \overline{\alpha_3}\end{bmatrix}[\overline{\alpha_1}\ \ \overline{\alpha_3}] = p_0|\psi_0\rangle\langle\psi_0| + p_1|\psi_1\rangle\langle\psi_1|$$

where:

$p_0$ is defined as $|\alpha_0|^2 + |\alpha_2|^2$;

$p_1$ is defined as $|\alpha_1|^2 + |\alpha_3|^2$;

$\overline{\alpha_0}$, $\overline{\alpha_1}$, $\overline{\alpha_2}$, and $\overline{\alpha_3}$ are normalized amplitudes of coefficients of the bases of the orthonormal basis of a quantum circuit, wherein the state of a quantum circuit is written as $|\Psi\rangle=\alpha_0|00\rangle+\alpha_1|01\rangle+\alpha_2|10\rangle+\alpha_3|11\rangle$;

$|\psi_0\rangle$ is defined as $\begin{bmatrix}\overline{\alpha_0}\\ \overline{\alpha_2}\end{bmatrix}$; and $|\psi_1\rangle$ is defined as $\begin{bmatrix}\overline{\alpha_1}\\ \overline{\alpha_3}\end{bmatrix}$; and classifying a test vector using a classical computing device based on the measurement.

6. The method of claim 5, further comprising classifying at least one further test vector based on the measurement.

7. The method of claim 6, further comprising classifying the at least one further test vector based on the measurement without repeating the executing and manipulating steps.

8. The method of claim 5, wherein the determining the measurement of the status of the at least one qubit comprises determining a measurement of the status of four qubits of the quantum computing device.

9. The method of claim 8, wherein the determining the measurement of the status of the four qubits of the quantum computing device comprises determining estimates of $a_0, a_1, \ldots, a_{15}$, wherein $a_0, a_1, \ldots, a_{15}$ comprise coefficients of quantum orthonormal bases $|0000\rangle, |0001\rangle, \ldots, |1111\rangle$ of the four qubits.

10. The method of claim 9, wherein the classifying a test vector using a classical computing device based on the measurement comprises:

determining $\alpha_1$ and $\alpha_2$, where:

$$\alpha_1 = a_0 + a_1 + a_4 + a_5 + a_8 + a_9 + a_{12} + a_{13}, \text{ and}$$

$$\alpha_2 = a_2 + a_3 + a_6 + a_7 + a_{10} + a_{11} + a_{14} + a_{15}; \text{ and}$$

determining a classification $y(\vec{x_0})$ of the test vector, where:

$$y(\vec{x_0}) = \mathrm{sign}\left(\sum_{i=1}^{M} \alpha_i(\vec{x_i}\cdot\vec{x_0}) + b\right),$$

$\vec{x_0}$ is the test vector, $\vec{x_i}$, i=1, . . . , M are the M training vectors;

b is 0, or an offset of a decision boundary between first and second classifications for the test vector; and

M=2.

11. An apparatus for determining a kernel matrix for a support vector machine algorithm, the apparatus comprising:

processing circuitry;

memory containing instructions executable by the processing circuitry whereby the apparatus is operative to:

manipulate quantum states of qubits of a quantum computing device based on a plurality of training vectors, each training vector representing a respective classification;

determine a measurement of a status of at least one of the qubits, wherein the measurement of the status of the at least one of the qubits comprises measuring $|\Psi\rangle=\alpha_0|00\rangle+\alpha_1|01\rangle+\alpha_2|10\rangle+\alpha_3|11\rangle$, where $|\Psi\rangle$ is the status of two of the qubits, $\alpha_0$ is a coefficient of the status of the qubits being $|00\rangle$, $\alpha_1$ is a coefficient of the status of the qubits being $|01\rangle$, $\alpha_2$ is a coefficient of the status of the qubits being $|10\rangle$, and $\alpha_3$ is a coefficient of the status of the qubits being $|11\rangle$, and wherein each coefficient is equivalent to a square of a corresponding probability of the qubits being measured in that status; and compute the kernel matrix based on the measurement using a classical computing device, wherein the computing the kernel matrix based on the measurement using a classical computing device comprises calculating a kernel matrix K such that:

$$K = \left(|\alpha_0|^2 + |\alpha_2|^2\right)\begin{bmatrix}\overline{\alpha_0}\\ \overline{\alpha_2}\end{bmatrix}[\overline{\alpha_0}\ \ \overline{\alpha_2}] + \left(|\alpha_1|^2 + |\alpha_3|^2\right)\begin{bmatrix}\overline{\alpha_1}\\ \overline{\alpha_3}\end{bmatrix}[\overline{\alpha_1}\ \ \overline{\alpha_3}] = p_0|\psi_0\rangle\langle\psi_0| + p_1|\psi_1\rangle\langle\psi_1|$$

where:

$p_0$ is defined as $|\alpha_0|^2 + |\alpha_2|^2$;

$p_1$ is defined as $|\alpha_1|^2 + |\alpha_3|^2$;

$\overline{\alpha_0}$, $\overline{\alpha_1}$, $\overline{\alpha_2}$, and $\overline{\alpha_3}$ are normalized amplitudes of coefficients of the bases of the orthonormal basis of a quantum circuit, wherein the state is written as $|\Psi\rangle=\alpha_0|00\rangle+\alpha_1|01\rangle+\alpha_2|10\rangle+\alpha_3|11\rangle$;

$|\psi_0\rangle$ is defined as $\begin{bmatrix} \overline{\alpha_0} \\ \overline{\alpha_2} \end{bmatrix}$; and $|\psi_1\rangle$ is defined as $\begin{bmatrix} \overline{\alpha_1} \\ \overline{\alpha_3} \end{bmatrix}$.

12. An apparatus for classifying a test vector using a support vector machine algorithm, the apparatus comprising:

processing circuitry;

memory containing instructions executable by the processing circuitry whereby the apparatus is operative to:

determine a kernel matrix of the support vector machine algorithm based on a plurality of training vectors, each training vector representing a respective classification;

execute, using a quantum computing device, a linear equation solution algorithm on qubits of the quantum computing device based on the kernel matrix;

manipulate at least one of the qubits of the quantum computing device based on the plurality of training vectors;

determine a measurement of a status of the at least one qubit, wherein the measurement of the status of the at least one qubit comprises measuring $|\Psi\rangle=\alpha_0|00\rangle+\alpha_1|01\rangle+\alpha_2|10\rangle+\alpha_3|11\rangle$, where $|\Psi\rangle$ is the status of two of the qubits, $\alpha_0$ is a coefficient of the status of the qubits being $|00\rangle$, $\alpha_1$ is a coefficient of the status of the qubits being $|01\rangle$, $\alpha_2$ is a coefficient of the status of the qubits being $|10\rangle$, and $\alpha_3$ is a coefficient of the status of the qubits being $|11\rangle$, and wherein each coefficient is equivalent to a square of a corresponding probability of the qubits being measured in that status; and compute the kernel matrix based on the measurement using a classical computing device, wherein the computing the kernel matrix based on the measurement using a classical computing device comprises calculating a kernel matrix K such that:

$$K = (|\alpha_0|^2 + |\alpha_2|^2)\begin{bmatrix} \overline{\alpha_0} \\ \overline{\alpha_2} \end{bmatrix}[\overline{\alpha_0} \quad \overline{\alpha_2}] + (|\alpha_1|^2 + |\alpha_3|^2)\begin{bmatrix} \overline{\alpha_1} \\ \overline{\alpha_3} \end{bmatrix}[\overline{\alpha_1} \quad \overline{\alpha_3}] = p_0|\psi_0\rangle\langle\psi_0| + p_1|\psi_1\rangle\langle\psi_1|$$

where:

$p_0$ is defined as $|\alpha_0|^2 + |\alpha_2|^2$;

$p_1$ is defined as $|\alpha_1|^2 + |\alpha_3|^2$;

$\overline{\alpha_0}$, $\overline{\alpha_1}$, $\overline{\alpha_2}$, and $\overline{\alpha_3}$ are normalized amplitudes of coefficients of the bases of the orthonormal basis of a quantum circuit, wherein the state is written as $|\Psi\rangle=\alpha_0|00\rangle+\alpha_1|01\rangle+\alpha_2|10\rangle+\alpha_3|11\rangle$;

$|\psi_0\rangle$ is defined as $\begin{bmatrix} \overline{\alpha_0} \\ \overline{\alpha_2} \end{bmatrix}$; and $|\psi_1\rangle$ is defined as $\begin{bmatrix} \overline{\alpha_1} \\ \overline{\alpha_3} \end{bmatrix}$; and classify a test vector using a classical computing device based on the measurement.

* * * * *